United States Patent
Taniguchi (10) Patent No.: US 7,573,523 B2
(45) Date of Patent: Aug. 11, 2009

(54) IMAGING APPARATUS INCLUDING ELECTRONIC VIEWFINDER

(75) Inventor: Naosato Taniguchi, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 647 days.

(21) Appl. No.: 11/047,274

(22) Filed: Jan. 27, 2005

(65) Prior Publication Data

US 2005/0168613 A1 Aug. 4, 2005

(30) Foreign Application Priority Data

Feb. 4, 2004 (JP) ............................. 2004-028162

(51) Int. Cl.
*H04N 5/222* (2006.01)

(52) U.S. Cl. .............................. 348/333.13; 348/333.01

(58) Field of Classification Search ............ 348/333.01, 348/333.09, 115, 744, 800, 372, 333.13; 359/630, 633, 209, 629; 345/7, 8, 9, 212; 396/374

See application file for complete search history.

(56) References Cited

U.S. PATENT DOCUMENTS

| | | | | |
|---|---|---|---|---|
| 4,945,424 A | * | 7/1990 | Hiroki et al. ................. 386/118 |
| 5,200,774 A | * | 4/1993 | Nakajima ..................... 396/51 |
| 5,313,305 A | * | 5/1994 | Harigaya et al. .......... 348/211.8 |
| 5,336,976 A | * | 8/1994 | Webb et al. .................. 315/134 |
| 5,355,181 A | * | 10/1994 | Ashizaki et al. ............. 348/744 |
| 5,467,104 A | | 11/1995 | Furness, III et al. |
| 5,521,638 A | * | 5/1996 | Dezaki et al. .......... 348/208.16 |
| 5,596,339 A | * | 1/1997 | Furness et al. ................. 345/8 |
| 5,606,447 A | | 2/1997 | Asada et al. |
| 5,699,115 A | * | 12/1997 | Hiraki et al. ............ 348/333.13 |
| 5,835,083 A | * | 11/1998 | Nielsen et al. ............... 345/211 |
| 5,966,553 A | * | 10/1999 | Nishitani et al. ............ 396/303 |
| 5,978,607 A | * | 11/1999 | Teremy et al. ............... 396/288 |
| 6,111,609 A | * | 8/2000 | Stevens ....................... 348/372 |
| 6,657,763 B2 | * | 12/2003 | Kobayashi ................... 359/212 |
| 6,661,393 B2 | * | 12/2003 | Tegreene et al. ................ 345/7 |
| 7,091,471 B2 | * | 8/2006 | Wenstrand et al. ........... 250/221 |
| 7,167,201 B2 | * | 1/2007 | Stavely et al. .......... 348/333.03 |
| 7,230,583 B2 | * | 6/2007 | Tidwell et al. .................. 345/8 |

FOREIGN PATENT DOCUMENTS

JP 8-334723 A 12/1996

OTHER PUBLICATIONS

Helsel, et al., "Wafer Scale Packaging for a MEMS Video Scanner",Society of Photo-Optical Instrumentation Engineers (SPIE), Conference #4407-19 (Jun. 2001).

* cited by examiner

*Primary Examiner*—Jason Chan
*Assistant Examiner*—Gary C Vieaux
(74) *Attorney, Agent, or Firm*—Canon USA Inc IP Division (57) ABSTRACT

An imaging apparatus including an electronic viewfinder comprising a light source, a scanning unit for scanning light emitted from the light source. The electronic viewfinder forms a two-dimensional image on a predetermined surface by synchronously modulating the light emitted from the light source with the operation of the scanning unit. The imaging apparatus further includes a controller capable of independently controlling the timing of turning on and off the light source and the timing of turning on and off the scanning unit. The controller controls the light source and the scanning unit in response to the on and off state of the power of the imaging apparatus so that when the light source is off the scanning unit is on.

6 Claims, 7 Drawing Sheets

IMAGING APPARATUS INCLUDING ELECTRONIC VIEWFINDER

BACKGROUND OF THE INVENTION

1. Field of the Invention

The present invention relates to an imaging apparatus (an image pickup apparatus) for imaging and recording, for example, still images and moving images. More specifically, the invention relates to methods for controlling and starting up an electronic viewfinder system included in the imaging apparatus.

2. Description of the Related Art

Various types of imaging apparatuses, such as digital still cameras and camcoders, for recording and reproducing still images and moving images stored on a recording medium such as a memory card or a magnetic tape having a solid-state memory element are already commercially available.

An imaging apparatus including an electronic viewfinder including a liquid crystal panel is also commercially available. A virtual image on a two-dimensional display element can be viewed through the electronic viewfinder, which typically comprises a combination of the two-dimensional display element, such as a transmissive liquid crystal display or a reflective liquid crystal display, and an eyepiece optical system.

Recently, high-definition has been required for the images viewed through such an electronic viewfinder. To achieve this requirement, a predetermined number of pixels corresponding to the required image quality must be provided on the two-dimensional display element. Since the number of pixels provided in the two-dimensional display element increases, the number of failed pixels among the provided pixels increases as well. Furthermore, production of the two-dimensional display element becomes difficult because the size of the individual pixels become smaller relative to the size of the entire two-dimensional display element. Moreover, since the liquid crystal included in a two-dimensional display element has a slow response speed, an after image is generated when a moving image is displayed on the two-dimensional display element.

Instead of a two-dimensional display element, an image display apparatus for displaying an image by scanning beams of light emitted from a light source by a two-dimensional light-scanning mechanism is disclosed in U.S. Pat. No. 5,467, 104. U.S. Pat. No. 5,467,104 discloses a technology for forming an image directly on the human retina by scanning red, blue, and green beams of light in two-dimensional directions (e.g., horizontal and vertical directions) and by using an optical system.

Such a technology does not require pixels to be formed in accordance with a predetermined resolution for scanning one light beam, as required for a two-dimensional image display element. Furthermore, pixel failure does not occur in principle.

In realizing such a scanning-type image display apparatus, a micro electro-mechanical system (MEMS) produced by a semiconductor process and used as light-scanning mechanism has been receiving attention. The light-scanning means produced based on such a MEMS technology is compact, light weight, and operable at high-speed. Such advantages are suitable for use as light-scanning mechanism for an image display apparatus. A light-scanning mechanism based on such MEMS technology is disclosed in Japanese Patent Laid-Open No. 07-175005 (corresponding to U.S. Pat. No. 5,606, 447) and Japanese Patent Laid-Open No. 08-334723. Similarly, a MEMS device used as two-dimensional scanning mechanism for a head-mounted display was introduced at the Society of Photo-Optical Instrumentation Engineers (SPIE), Conference #4407-19 (June 2001, "Wafer Scale Packaging for a MEMS Video Scanner").

The light-scanning mechanism based on MEMS technology performs scanning by polarizing light entering a reflecting surface tilted by torsion generated when a torsion bar is mechanically resonated. Since torsion is used, the light-reflecting surface does not rotate, but rather oscillates.

The fundamental frequency for such a mechanical resonance is determined by the mechanical size of the light-scanning mechanism. The light-scanning mechanism functions by being resonated by an electrostatic force or an electromagnetic force.

U.S. Pat. No. 5,467,104 discloses a two-dimensional scanning method in which a light-scanning mechanism is provided to perform light-scanning by resonance in a first direction and then another light-scanning mechanism is provided to perform scanning in a second direction.

However, a light-scanning mechanism based on such MEMS technology requires a predetermined amount of time until the driving control stabilizes because the light-reflecting surface is resonated by an electrostatic force or an electromagnetic force. Therefore, an imaging apparatus having an electronic viewfinder using such light-scanning mechanism requires a predetermined amount of start-up time.

Furthermore, an electronic viewfinder system using such a light-scanning mechanism consumes a large amount of electricity for the light source of the light beams used for scanning. Therefore, it has been a pressing issue to extend the operating time of a primary battery, such as an alkaline battery or a lithium battery, and a secondary battery, such as a NiCd battery, NiMH battery, or a Li battery, by reducing electricity consumption.

SUMMARY OF THE INVENTION

The present invention provides a compact imaging apparatus including an electronic viewfinder using a light-scanning mechanism produced based on MEMS technology. The start-up time of the electronic viewfinder is shortened and the electricity consumption of the imaging apparatus is reduced.

The imaging apparatus according to the present invention includes an electronic viewfinder comprising a light source, a scanning unit for scanning light emitted from the light source. The electronic viewfinder forms a two-dimensional image on a predetermined surface by modulating the light emitted from the light source synchronously with the operation of the scanning unit. The imaging apparatus further comprises a controller capable of independently controlling the timing of turning on and off the light source and the timing of turning on and off the scanning unit. The controller controls the light source and the scanning unit in response to the on and off state of the power of the imaging apparatus so that when the light source is off the scanning unit is on.

Further features and advantages of the present invention will become apparent from the following description of exemplary embodiments with reference to the attached drawings.

DESCRIPTION OF THE EMBODIMENTS

Embodiments of a control method and a start-up method for an imaging apparatus according to the present invention including an electronic viewfinder system will be described below. An imaging apparatus according to an embodiment of the present invention is employed in an imaging apparatus having an electronic viewfinder, such as an electronic camera or a digital video camcoder.

First Embodiment

[Description of the Overall Structure]

Figure 1:
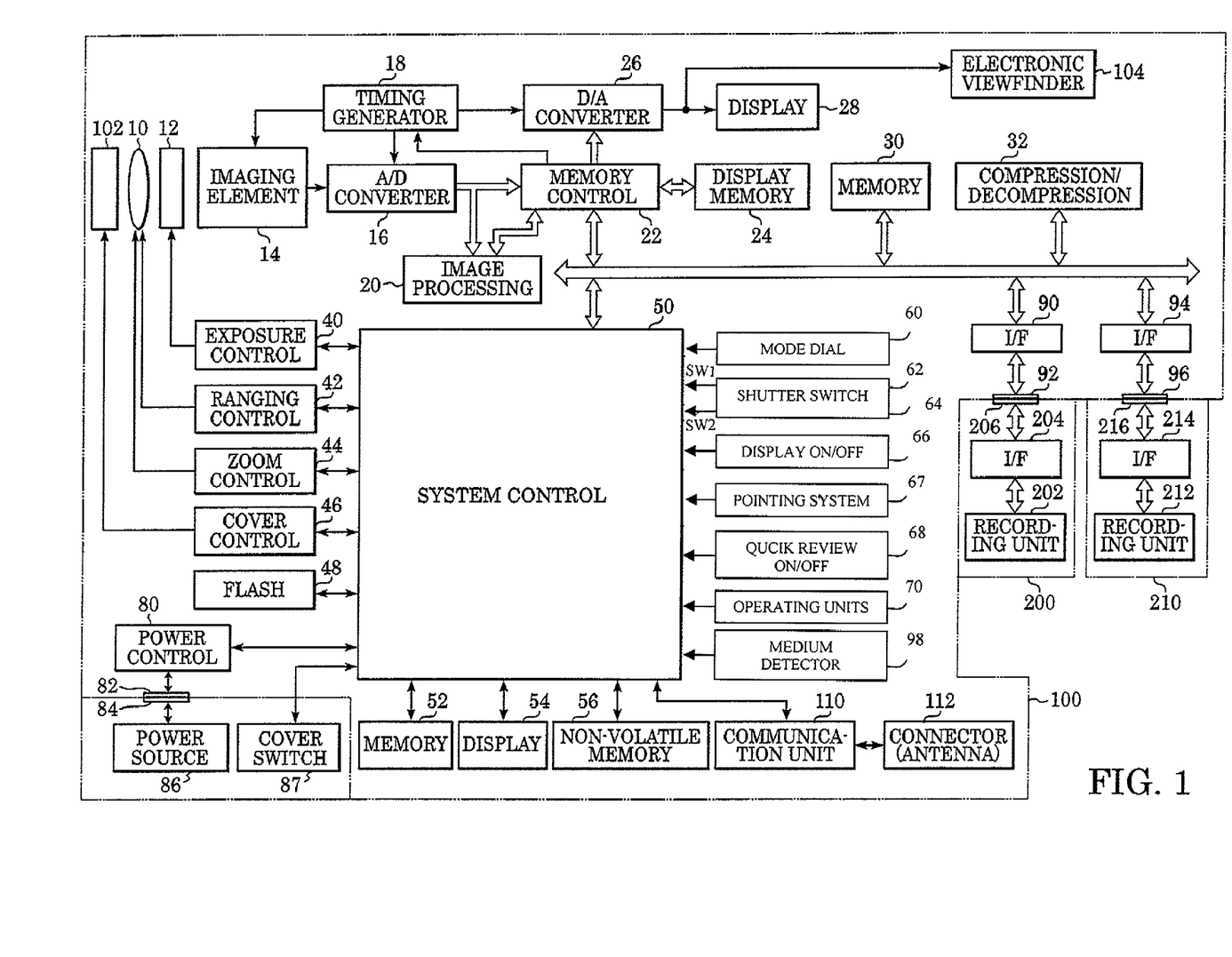
FIG. 1 illustrates the structure of an electronic camera according to a first embodiment of the present invention.

FIG. 1 illustrates the structure of an electronic camera according to a first embodiment of the present invention. FIG. 1 illustrates an electronic camera 100, a photographic lens 10, a shutter 12 having an aperture function, a solid-state imaging element 14, such as a charge-coupled device (CCD), capable of converting the optical image formed by the photographic lens 10 into an electric signal, and an analog/digital (A/D) converter 16 capable of converting the analog signal output from the imaging element 14 into a digital signal.

A timing generator circuit 18 supplies a clock signal and a control signal to the imaging element 14, the A/D converter 16, and a digital/analog (D/A) converter 26 and is controlled by a memory control circuit 22 and a system control circuit 50.

An image processing circuit 20 performs predetermined pixel interpolation and color transfer on data from the A/D converter 16 or the memory control circuit 22. The image processing circuit 20 performs predetermined arithmetic processing using image data obtained by capturing an image. Based on the obtained results of the arithmetic processing, the system control circuit 50 controls through-the-lens (TTL) automatic focusing (AF), automatic exposure (AE), and the preflash for an electronic flash (EF) by controlling an exposure controller 40 and ranging controller 42. The image processing circuit 20 carries out predetermined arithmetic processing using the captured imaging data and, then, based on the results of the arithmetic processing, performs through-the-lens (TTL) automatic white balance (AWB) processing.

The memory control circuit 22 controls the A/D converter 16, the timing generator circuit 18, the image processing circuit 20, an image display memory 24, the D/A converter 26, a memory 30, and a compression and decompression circuit 32. The data of the A/D converter 16 is written in the image display memory 24 or the memory 30 via the image processing circuit 20 and the memory control circuit 22 or, instead, the data of the A/D converter 16 is directly written in the image display memory 24 or the memory 30 via the memory control circuit 22.

An image display unit 28 is comprised of a thin-film transistor (TFT) liquid crystal display (LCD) and is disposed on the back side of the main body of the electronic camera 100 facing the photographer. The captured image data written in the image display memory 24 is displayed on the image display unit 28 via the D/A converter 26. The function of the electronic viewfinder is realized by displaying the captured image data in sequence on the image display unit 28. The system control circuit 50 is capable of controlling the image display unit 28 to turn on and off anytime. When the image display unit 28 is turned off, the electricity consumption of the electronic camera 100 is significantly reduced.

The memory 30 has a memory capacity sufficient for storing a predetermined number of static images and moving images and stores the captured static images and moving images. When a series of static images are captured, such as in capturing continuous images and panoramic images, a large number of images are quickly written in the memory 30. The memory 30 may also be used as a working area for the system control circuit 50.

The compression and decompression circuit 32 compresses and decompresses image data by adaptive discrete cosine transform (ADCT). After compressing or decompressing the image data, the compression and decompression circuit 32 writes the data in the memory 30. The exposure controller 40 controls the shutter 12 having an aperture function. The exposure controller 40 also has a flash control function and operates cooperatively with a flash 48.

The ranging controller 42 controls the focusing of the photographic lens 10. A zoom controller 44 controls the zooming of the photographic lens 10. A cover controller 46 controls the operation of a protector 102, which is a cover.

The flash 48 has an automatic focus (AF) assist light function and a flash control function. The exposure controller 40 and the ranging controller 42 are controlled based on a TTL system. The system control circuit 50 controls the exposure controller 40 and the ranging controller 42 based on the results of arithmetic processing performed by the image processing circuit 20 on the captured image data.

The system control circuit 50 controls the entire electronic camera 100. The system control circuit 50 comprises a microcomputer unit including a central processing unit (CPU) and executes programs stored in a memory 52. The memory 52 stores constants, variables, and programs for operating the system control circuit 50.

A display unit 54 includes a display for displaying text and images, such as the operational state of the electronic camera 100 or instructional messages concerning the operation of the electronic camera 100, in accordance with the program executed by the system control circuit 50. The display unit 54 also includes a speaker for playing audio. One or more display units 54 are disposed in the vicinity of the operating unit of the electronic camera 100 at a position easily visible. In this embodiment, the display unit 54 is a combination of an LCD, a light-emitting diode (LED), and an audio element. Part of the display unit 54 is also disposed inside the electronic viewfinder 104.

The information displayed on the LCD of the display unit 54 includes: single shot or continuous shooting, self-timer, compression ratio, valid pixels, total number of recordable images, remaining number of recordable images, shutter speed, aperture, exposure adjustment, flash, red-eye reduction, zoom, buzzer settings, clock battery power, camera battery power, error indication, multi-digit number display, installation/removal of recording media 200 and 210, communication interface (I/F) operation, and date and time.

The information displayed on the electronic viewfinder 104 of the display unit 54 includes: focusing, image stabilizer alert, flash battery power, shutter speed, aperture, and exposure adjustment.

Data is electrically written in and erased from a non-volatile memory 56, such as an electrically erasable programmable read-only memory (EEPROM).

[Description of Switches]

Operating units are used for inputting various operational commands to the system control circuit 50. Each operating unit includes one or a combination of switches, dials, touch panels, sight detection pointing system, and a speech-recognition device.

The operating units will be described in detail below. A mode dial 60 is for switching between various modes including a power ON/OFF mode, shooting modes, such as an automatic shooting mode and a panoramic shooting mode, and various other modes, such as a replay mode, replay and erase mode on multiple screens, and a personal computer (PC) connection mode.

A shutter switch SW1 62 is operable when a shutter button (not shown in the drawing) is being operated and sends a command so as to start the processes of automatic focus (AF), automatic exposure (AE), automatic white balance (AWB), and a preflash of an electronic flash (EF).

A shutter switch SW2 64 is operable when the operation of the shutter button (not shown in the drawing) is completed. The shutter switch SW2 64 sends a command so as to start a series of processes including an exposure process in which a signal read out from the imaging element 14 is converted into digital data by the A/D converter 16 and the digital image data is written in the memory 30 via the memory control circuit 22; a developing process based on arithmetic processing carried out by the image processing circuit 20 and the memory control circuit 22; and a recording process in which image data is read out from the memory 30, is compressed at the compression and decompression circuit 32, and is written in the recording media 200 and 210.

An image display selection switch 66 is used to set and select the on and off state of the image display of the image display unit 28 and the electronic viewfinder 104. Power can be saved by shutting off the electricity supply to the image display unit 28, which includes a TFT LCD, when capturing an image using the electronic viewfinder 104. Power can also be saved by turning off the display of the electronic viewfinder 104 when capturing an image using the image display unit 28.

To save power, a pointing system 67 based on sight detection disposed inside the electronic viewfinder 104 can be used cooperatively with the image display selection switch 66. More specifically, power can be saved by shutting off the electricity supply to the light source of the electronic viewfinder 104 if a photographer is not looking into the electronic viewfinder 104 for a predetermined amount of time or, if the sight detection system does not send out a signal for a predetermined amount of time.

A quick review ON/OFF switch 68 is used to set the quick review function for automatically replaying the image data of a captured image immediately after the image is captured. According to this embodiment, the quick review function is turned on when the image display unit 28 is turned off.

Operating unit 70 includes various buttons and touch panels such as a menu button, a set button, zooming buttons, a multiple screens replay and page renewal button, a flash setting button, a single shot/continuous shooting/self timer switching button, a menu forward (+) button, a menu backward (−) button, an image replay forward (+) button, an image replay backward (−) button, an image quality setting button, an exposure adjustment button, a data/time setting button.

A power supply controller 80 comprises a battery detection circuit, a direct-current-to-direct-current (DC-DC) converter, and a switching circuit for changing the block to be supplied with electricity (all components not shown in the drawing). The power supply controller 80 detects whether or not a battery is installed, the type of the installed battery, and the remaining battery power. Then, the power supply controller 80 controls the DC-DC converter based on the detected results and commands from the system control circuit 50 so as to supply a predetermined voltage for a predetermined amount of time to each component, including a recording medium.

Connectors 82 and 84 are detachable. A power source 86 includes a primary battery, such as an alkaline battery or a lithium battery, and a secondary battery, such as a NiCd battery, a NiMH battery, or a Li battery, and an alternating current (AC) adapter (AC coupler).

A battery cover switch (cover detector) 87 detects whether or not the cover covering the installed battery is open. The battery cover switch 87 detects the power source 86 being replaced.

Interfaces 90 and 94 are connectors connected to recording media, such as a memory card and a hard disk. A recording medium detector 98 detects whether or not the recording media 200 and 210 are connected to connectors 92 and 96.

Two systems of interfaces and connecters for connecting recording media are provided for this embodiment. The interfaces and connecters for connecting recording media may be provided as a single system or multiple systems. Furthermore, interfaces and connectors having different standards may be combined.

The interfaces and connectors may be ones that comply with the standards of Personal Computer Memory Card International Association (PCMCIA) cards or Compact Flash™ (CF) cards.

If the interfaces 90 and 94 and the connectors 92 and 96 comply with the standards of a PCMCIA card or a CF card, various communication cards, such as a local area network (LAN) card, a modem card, a universal serial bus (USB) card, an IEEE-1394 card, a P1284 card, a small computer system interface (SCSI) card, and a communication card for a personal handyphone system (PHS), may be connected to the electronic camera 100 so that image data and management data associated with the image data can be sent between the electronic camera 100 and other computers and peripheral devices, such as printers.

A cover (protector) 102 covers the imaging unit of the electronic camera 100 including the photographic lens 10 and protects the imaging unit from contamination and damage. The electronic viewfinder 104 takes on part of the functions of the display unit 54 and displays information concerning, for example, focusing, image stabilizer alert, flash battery power, shutter speed, aperture, and exposure adjustment.

A communication unit 110 includes various communication functions, such as RS232C, USB, IEEE-1394, P1284, SCSI, modem, LAN, and wireless communication. A connector 112 connects the communication unit 110 of the electronic camera 100 to other devices. The connector 112 may be an antenna if wireless communication is used.

The recording medium 200 is a memory card or a hard disk. The recording medium 200 includes a recording portion 202 comprising a semiconductor memory or a magnetic disk and an interface 204 and a connector 206 for connecting the recording medium 200 to the electronic camera 100. Similar to the recording medium 200, the recording medium 210 is a memory card or a hard disk. The recording medium 210 includes a recording portion 212 comprising a semiconductor memory or a magnetic disk and an interface 214 and a connector 216 for connecting the recording medium 210 to the electronic camera 100.

Figure 2:
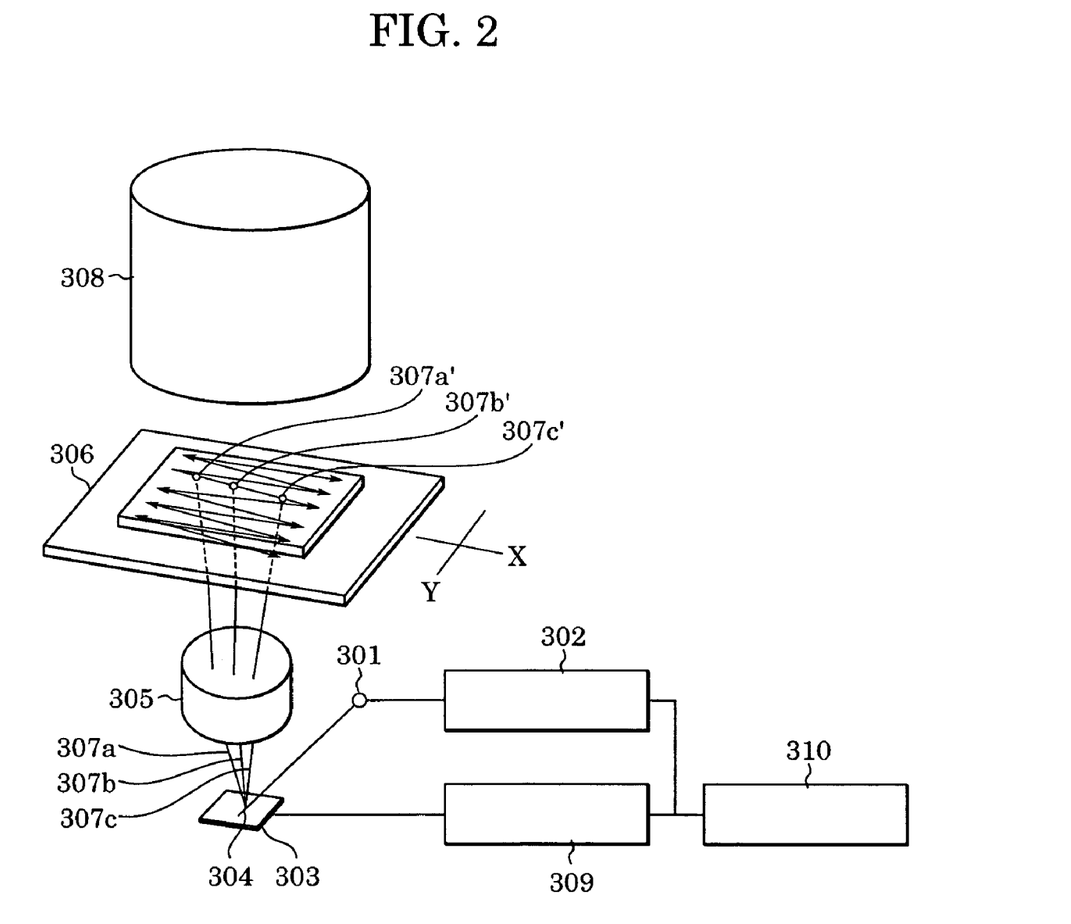
FIG. 2 is a schematic view of the structure of an electronic viewfinder according to the present invention.

FIG. 2 illustrates the outline of the structure of the electronic viewfinder 104 according to the present invention. A light source 301 is modulated by a light-source driving circuit 302. Light emitted from the light source 301 is converged into one beam of light by a light-condensing optical system (not shown in the drawing) and enters light-scanning means 303.

An electronic viewfinder using only one light source will be described to simplify the description of the electronic camera 100 according to this embodiment. However, it is possible to use a color electronic viewfinder in which a three-color light source converged into one beam by a light-condensing optical system or a color-combination optical system is emitted to the light-scanning means 303.

The light that has entered the light-scanning unit 303 is deflected at a deflection point 304 and scans the scanned surface 306 via a scanning optical system 305. The light source 301 and the scanned surface 306 are substantially in a conjugate relationship due to the converging optical system and the light-scanning optical system 305. A light source image is thus formed on the scanned surface 306.

Light beams 307a, 307b, and 307c are emitted from the light-scanning unit 303 and form focal points 307a', 307b', and 307c', respectively, on the scanned surface 306. The focal points 307a', 307b', and 307c' are swept across the surface 306 in the Y direction in the drawing. However, the light-scanning unit 303 is two-dimensional scanning mechanism capable of scanning in the Y direction and the X direction, which is orthogonal to the Y direction.

The light-scanning unit 303 is controlled by a light-scanning control circuit 309. The light-scanning control circuit 309 and the light-source driving circuit 302 are electrically connected to and are controlled synchronously with a display-unit-control circuit 310. Image data of captured images is input to the display-unit-control circuit 310 in series via the D/A converter 26. In this way, captured images can be displayed on the scanned surface 306. When a viewer positions his or her eye at the eye point of an eyepiece optical system 308, the viewer can see the image on the scanned surface 306 as a virtual image through the eyepiece optical system 308. In FIG. 2, the X direction is the horizontal direction, and the Y direction is the vertical direction.

Figure 3:
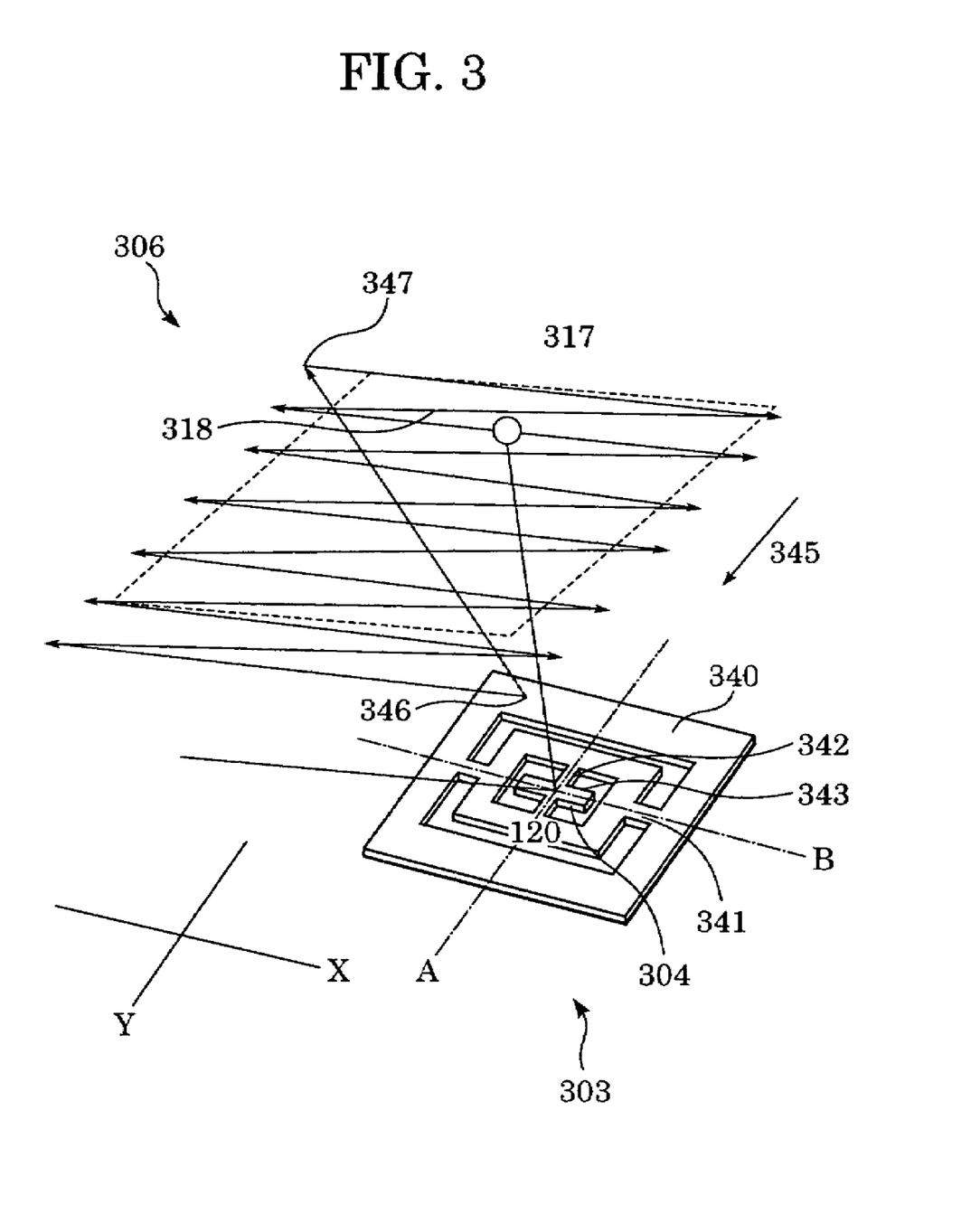
FIG. 3 is a schematic view of light-scanning means constituting the electronic viewfinder according to the present invention.

An overview of the light-scanning unit 303 will be described with reference to FIG. 3. FIG. 3 illustrates the main structure of the light-scanning unit 303 and the relationship between the light-scanning unit 303 and the scanned surface 306. The light-scanning unit 303 includes a substrate 340. A mirror 343 is provided at the deflection point 304 of the substrate 340.

The mirror 343 is supported by a gimbal structure including a torsion bar 342 for oscillating the mirror 343 in the horizontal (X) direction and a torsion bar 341 for oscillating the mirror 343 in the vertical (Y) direction. The mirror 343 is driven in the horizontal (X) direction by an actuator (not shown in the drawing). Accordingly, the torsional resonance of the gimbal structure causes the deflection angle of the mirror 343 to change so that the reflected light sweeps the scanned surface 306. The mirror 343 is driven in the vertical (Y) direction by an actuator (not shown in the drawing). The movement in the vertical (Y) direction is controlled synchronously with movement in the horizontal (X) direction. A line 317 in FIG. 3 represents the first movement (starting from a starting point 346) of the scanning beam operated by oscillation generated by the torsion bars 341 and 342, and line 318 represents the second movement. To simplify the drawing, the number of scanning lines illustrated in the drawing is reduced compared to the actual number of scanning lines. The mirror 343 is operated synchronously with the oscillation so that the scanning beam sweeps the scanned surface 306 in the Y direction indicated by an arrow 345 in the drawing. At the same time, the light source 301 is modulated synchronously with the oscillation so as to display an image on the scanned surface 306. When the scanning beam reaches a scanning edge 346 in the vertical (Y) direction, the scanning beam returns to the starting point 347. The cycle of the repeated movement in the vertical direction determines the frame rate of the imaging.

Figure 4:
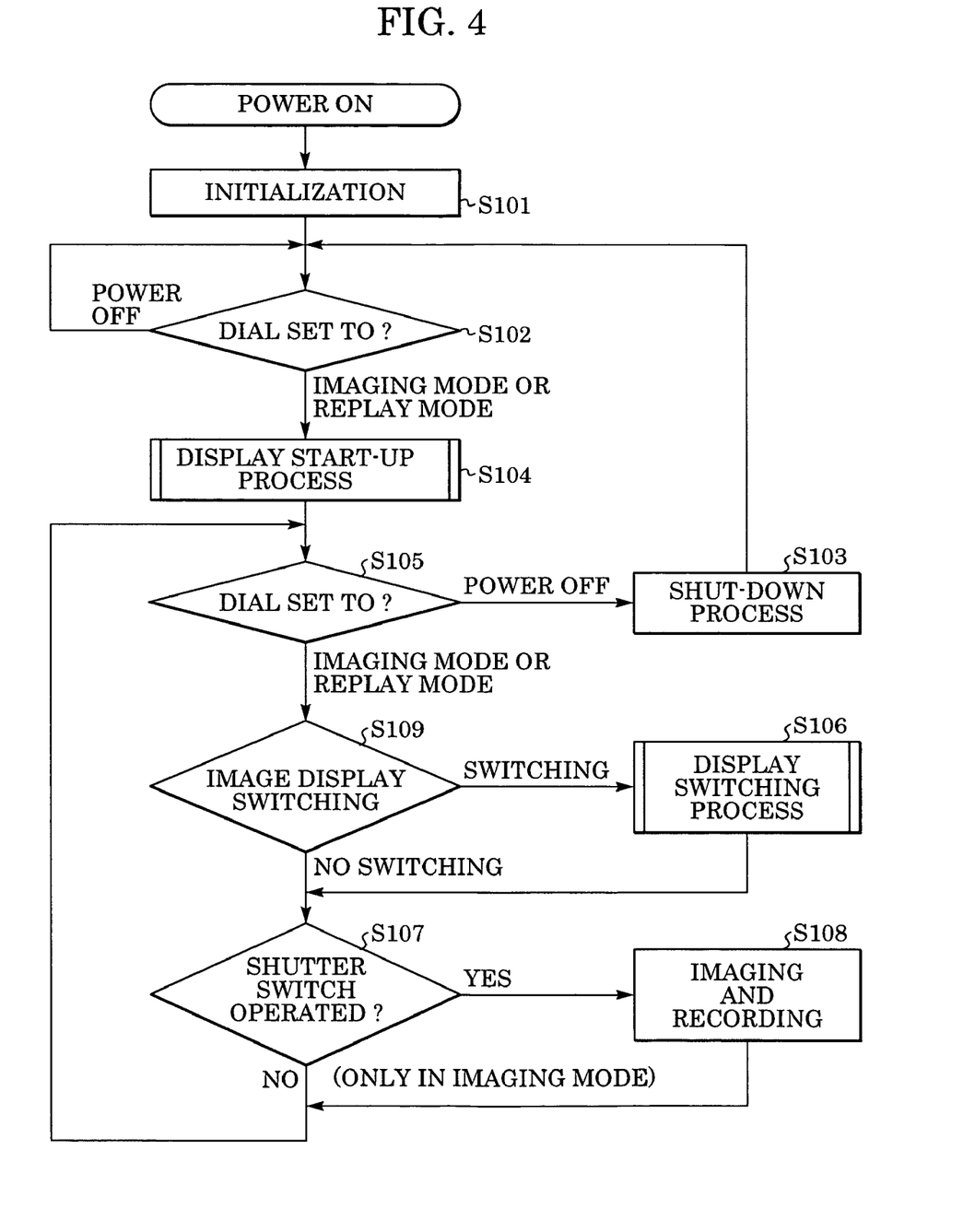
FIG. 4 is flow chart illustrating the imaging operation process.

FIG. 4 is a flow chart illustrating the imaging operation process. The processing program for this process is stored in the memory 52 and is executed by a CPU included in the system control circuit 50.

As illustrated in FIG. 4, when a power source is turned on to start the electricity supply, for example, by replacing a battery, the system control circuit 50 initializes the flags and control variables. Simultaneously, the components of the imaging apparatus enter a normal state in which, for example, the cover of the protector 102 is closed (Step S101). At this time, flags indicating the display status stored in the non-volatile memory 56 are also read in the system control circuit 50.

The system control circuit 50 determines the mode setting of the mode dial 60 (Step S102). If the mode dial 60 is set to POWER OFF, no operation is carried out. This power-off state continues until the mode dial 60 is operated and the mode setting is changed.

At this time, if the mode dial 60 is operated and the mode is changed to an imaging mode or a replay mode, the system control circuit 50 starts up the display of the image display unit 28 and the electronic viewfinder 104 (Step S104). Details of this display start-up process of Step 104 will be described below.

After start up of the image display unit 28, the system control circuit 50 enters a stand-by mode and waits for an external operation, such as capturing an image, to be carried out.

In this stand-by mode, the mode setting of the mode dial 60 is confirmed (Step S105). When the mode dial 60 is set to POWER OFF, each display unit is turned off, the cover of the protector 102 is closed to protect the imaging unit as described above, necessary parameters, set values, setting modes including flags and control variables are recorded in the non-volatile memory 56, and the power supply controller 80 carries out predetermined shut-down processes, such as shutting off unnecessary power supplied to various components of the electronic camera 100 including the image display unit 28 (Step S103). Then, the process returns to Step S102 in which the electronic camera 100 enters a stand-by state and the mode dial 60 waits for its setting to be changed.

In the stand-by state, the system control circuit 50 checks the status of the image display selection switch 66 (Step S109). If the status is determined to be "switching", then the display status of the display units is switched between an image displayed on the LCD of the image display unit 28, an image displayed on the electronic viewfinder 104, and information displayed on the image display unit 28 (Step S106). Details of this display switching process of Step S106 are described below.

If, on the other hand, the status in step S109 is determined to be "not switching", then, while in the stand-by state, the system control circuit 50 checks the status of the shutter switches 62 and 64 (Step S107). If the shutter switches 62 and 64 are pressed down, imaging and recording processes are carried out by a known mechanism (Step S108).

If settings of the mode dial 60, the image display selection switch 66, and the shutter switches 62 and 64 are not changed, the status in accordance with these settings is maintained.

Figure 5:
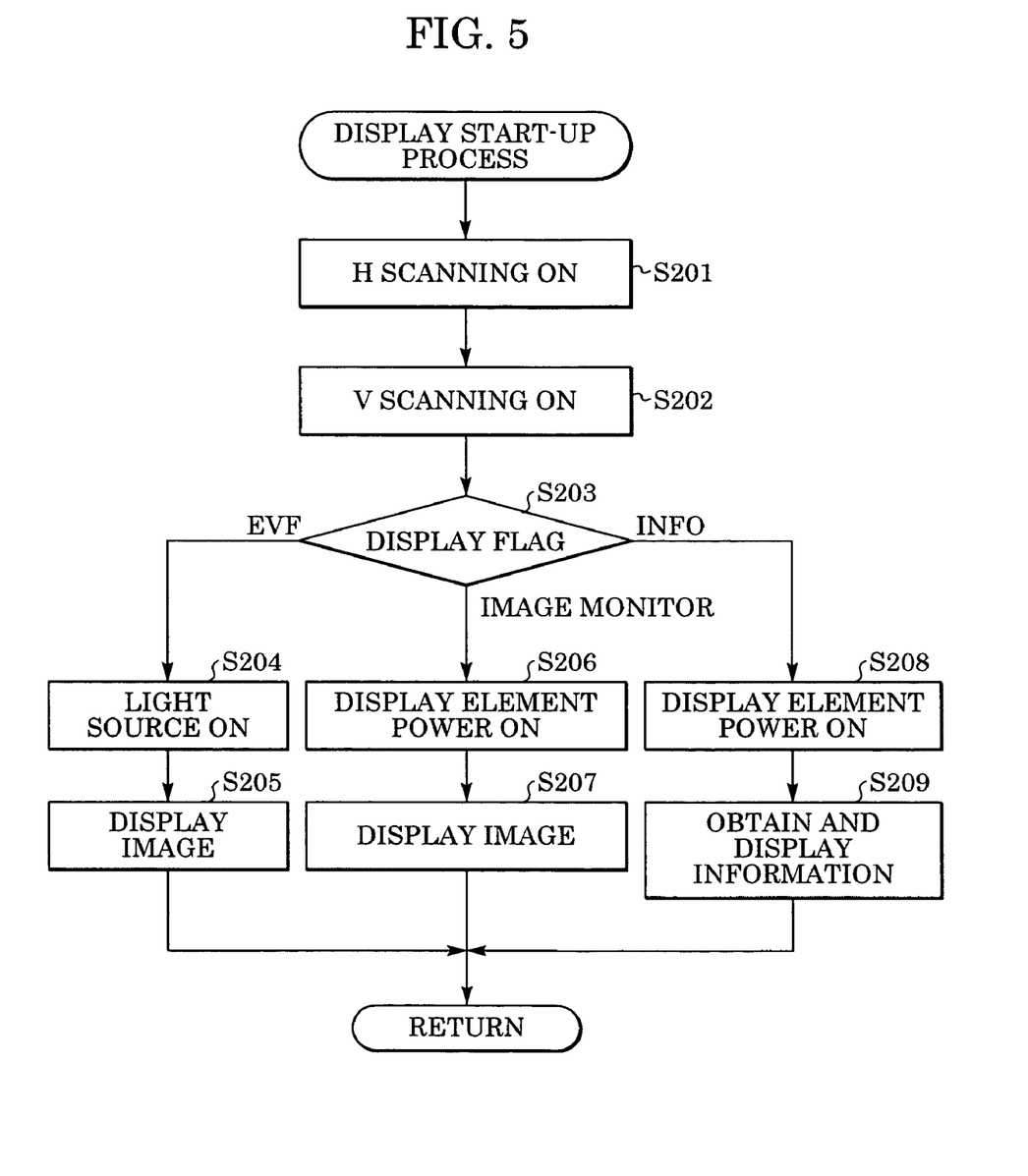
FIG. 5 is a flow chart illustrating the imaging start-up process of Step S104.

FIG. 5 is a flow chart illustrating the display start-up process in Step S104. As the system control circuit 50 enters the display start-up process, the light-scanning control circuit 309 of the light-scanning unit 303 of the electronic viewfinder 104 is started up and the mirror 343 is oscillated in the horizontal (X) direction (H scanning) (Step S201). Subsequently, the mirror 343 is oscillated in the vertical (Y) direction (V scanning) (Step S202). If the mode setting of the mode dial 60 is changed to a mode that requires the main power to be turned on, such as a shooting mode or a replay mode (i.e., a mode in which the electronic viewfinder 104 may be used), the scanning operation of the light-scanning means 303 begins whether or not the electronic viewfinder 104 is actually in use. In this way, the electronic viewfinder 104 is capable of displaying an image instantaneously at any time while the electronic camera 100 is in operation, regardless of the start-up time of the scanning operation of the light-scanning unit 303. If the electronic viewfinder 104 is not actually in use, excess power consumption can be prevented by turning off the light source 301 and light-source driving circuit 302 by controlling these independently from the light-scanning control circuit 309, as described below.

Subsequently, the system control circuit 50 checks for a display flag stored in the non-volatile memory 56 (Step S203). As described above, the non-volatile memory 56 stores the various settings, such as necessary parameters, setting values, and setting modes including flags and control variables, set during the scanning operation of the electronic camera 100. In Step S203, the system control circuit 50 reads out an appropriate flag related to the display and checks for the display status specified previously by the image display selection switch 66.

Three examples of statuses identified by a display flag are "EVF," "image monitor," and "INFO." In this case, value "1" of the display flag represents "EVF," value "2" represents "image monitor," and value "3" represents "INFO." Any value may be taken by the display flag so long as the different statuses are identifiable.

When the display flag is identified as "EVF," the electronic viewfinder 104 is used for displaying the image data. When the display flag is identified as "image monitor," the image display unit 28 is used for displaying the image data. When the display flag is identified as "INFO," the image display unit 28 is used for displaying the image data and other information including imaging conditions.

The information displayed on the image display unit 28 may include: image size, single shot or continuous shooting, self-timer, compression ratio, white balance, recorded number of images, remaining number of recordable images, shutter speed, aperture, exposure adjustment, flash, red-eye reduction, zoom, buzzer settings, clock battery power, battery power, error indication, multi-digit number display, installation/removal of recording media 200 and 210, communication interface (I/F) operation, and date and time.

When the value of the display flag confirmed in Step S203 is "1," the system control circuit 50 drives the light-source driving circuit 302 via the display-unit-control circuit 310 of the electronic viewfinder 104 (Step S204), and displays the image data of a captured image on the electronic viewfinder 104 by modulating the data in accordance with the signals input to the D/A converter 26 (Step S205).

Similarly, when the value of the display flag confirmed in Step S203 is "2," the system control circuit 50 turns on the power of the image monitor, such as the LCD, (Step S206) and drives the pixels of the LCD in accordance with the signals from the D/A converter 26 so as to display a captured image on the image display unit 28 (Step S207).

When the value of the display flag confirmed in Step S203 is "3," the system control circuit 50 turns on the power of the image monitor, such as the LCD, (Step S208) and obtains information, such as the imaging conditions, and displays this information (Step S209).

Figure 6:
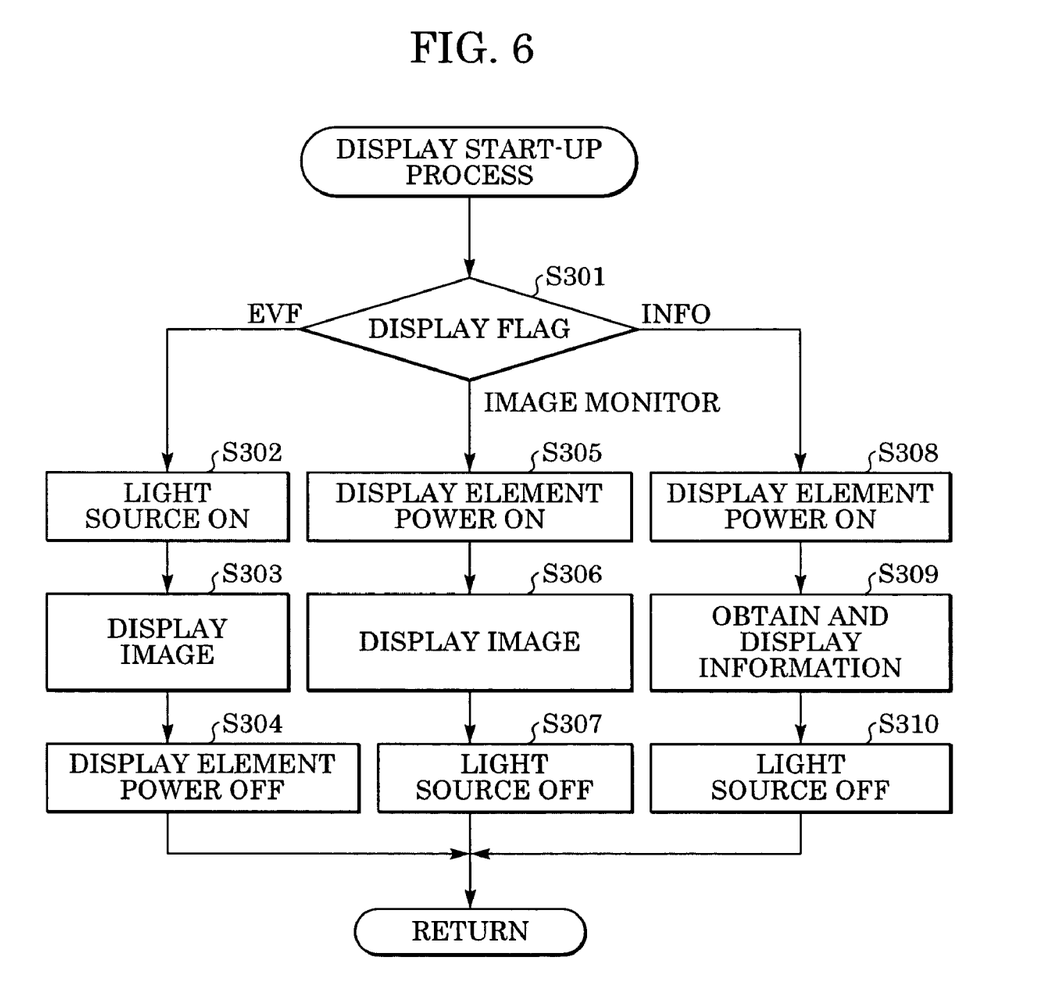
FIG. 6 is a flow chart illustrating the image display switching process of Step S106.

FIG. 6 is a flow chart illustrating the image display switching process of Step S106 for when an image display switching command is input from the image display selection switch 66 when the electronic camera 100 is in a stand-by state. In this process, the system control circuit 50 switches the display on the image display unit 28 and the electronic viewfinder 104 in accordance with the display flag input from the image display selection switch 66.

First, the display flag stored in the non-volatile memory 56 and input from the image display selection switch 66 is determined (Step S301).

If the value of the display flag represents "EVF," the process for displaying an image on the electronic viewfinder 104 is carried out. More specifically, the system control circuit 50 drives the light-source driving circuit 302 via the display-unit-control circuit 310 (Step S302) and displays the image data of a captured image on the electronic viewfinder 104 by modulating the data in accordance with the signals input to the D/A converter 26 (Step S303). At the same time, the system control circuit 50 turns off the image displayed on the image display unit 28 (Step S304).

If the value of the display flag represents "image monitor," the power of the image monitor, such as the LCD, constituting the image display unit 28 is turned on (Step S305), and the pixels of the LCD are driven in accordance with the signals from the D/A converter 26 so as to display the captured image on the image display unit 28 (Step S306). At this time, the light source 301 and the light-source driving circuit 302 of the electronic viewfinder 104 are turned off if they had been turned on (Step S307).

If the value of the display flag represents "INFO," the process for displaying information on the image display unit 28 is carried out. More specifically, information necessary for displaying is obtained (Step S309), and, the light-source driving circuit 302 of the electronic viewfinder 104 is turned off if it had been turned on (Step S310).

When a display flag is rewritten, the rewritten display flag is stored in the non-volatile memory 56 and its value is stored even after the power of the electronic camera 100 is turned off. According to this embodiment, image data is displayed only on one of the electronic viewfinder 104 and the image display unit 28. A mode in which image data is displayed on both the electronic viewfinder 104 and the image display unit 28 may be added to the electronic camera 100. Moreover, according to this embodiment, information is only displayed on the image display unit 28. This information, however, may also be displayed on the electronic viewfinder 104.

As described above, in Step S104 according to the first embodiment of the present invention, whenever the mode dial 60 is set to a shooting mode or a replay mode, the light-scanning control circuit 309 of the light-scanning unit 303 of the electronic viewfinder 104 is started up and the mirror 343 is oscillated in the horizontal (X) direction. Then, the mirror 343 is also oscillated in the vertical (Y) direction. In this way, the display can be switched in accordance with the display flag stored in the non-volatile memory 56 while the oscillation control of the light-scanning unit 303 is stabilized. Accordingly, an image can be displayed stably on the electronic viewfinder 104 immediately after the mode dial 60 has been switched to "EVF." From a user's point of view, the time required from turning on the shooting mode to displaying an image on the electronic viewfinder 104 is shortened.

Until a display flag having a value representing "EVF" is read in, the light source 301 and the light-source driving circuit 302 of the electronic viewfinder 104 are not turned on and only the oscillation of the mirror 343 is carried out. In this way, electricity consumption can be reduced.

By starting up the electronic viewfinder 104 or the image display unit 28 in accordance with the value indicated by the display flag stored in the non-volatile memory 56 in Step S104 of the display start-up process, the electronic camera 100 can be restarted with the same settings as before the battery was replaced or before the mode dial 60 was set to POWER OFF even if the battery of the electronic camera 100 is replaced or the mode dial 60 is switched from POWER OFF to shooting mode.

Although descriptions were omitted in this embodiment, for a camera having a retractable photographic lens in which the photographic lens can be stored inside the camera body, the mode dial 60 may be controlled by the cover opening and closing signal of the protector 102. When carrying out the imaging process illustrated in FIG. 4 for a camera having such a retractable lens, the lens-retraction control for extending the retractable lens is carried out after the display start-up process of Step S104 is carried out.

Second Embodiment

Since the structure of an electronic camera according to a second embodiment is the same as the electronic camera 100 according to the first embodiment, descriptions of the structure are omitted. Steps in the imaging process that differ from the first embodiment are described below.

Display control using a pointing system based on sight detection will be described below. The pointing system according to this embodiment is part of an operating unit 70, including an image display selection switch 66, various buttons, and a touch panel.

As described in the first embodiment, the image display selection switch 66 and the mode dial 60 switch the image display between the image display unit 28 and the electronic viewfinder 104.

According to this embodiment, to prevent battery drain while displaying an image on the electronic viewfinder 104 based on a display flag having a value representing "EVF," a pointing system (not shown in the drawings) of a known sight detection device is used. Usually, a pointing system based on sight detection determines the focal area and selects icons displayed on the viewfinder based on a detection signal representing the direction of view of a viewer. A sight detection signal is output when a viewer (e.g., photographer) looks into the electronic viewfinder 104. In other words, if a sight detection signal is not output for a predetermined amount of time, this means that the viewer is not looking into the electronic viewfinder 104. Therefore, if a sight detection signal is not received for a predetermined about of time, the light-source driving circuit 302 temporarily turns off the light source 301. In this way, electricity consumption can be reduced.

Figure 7:
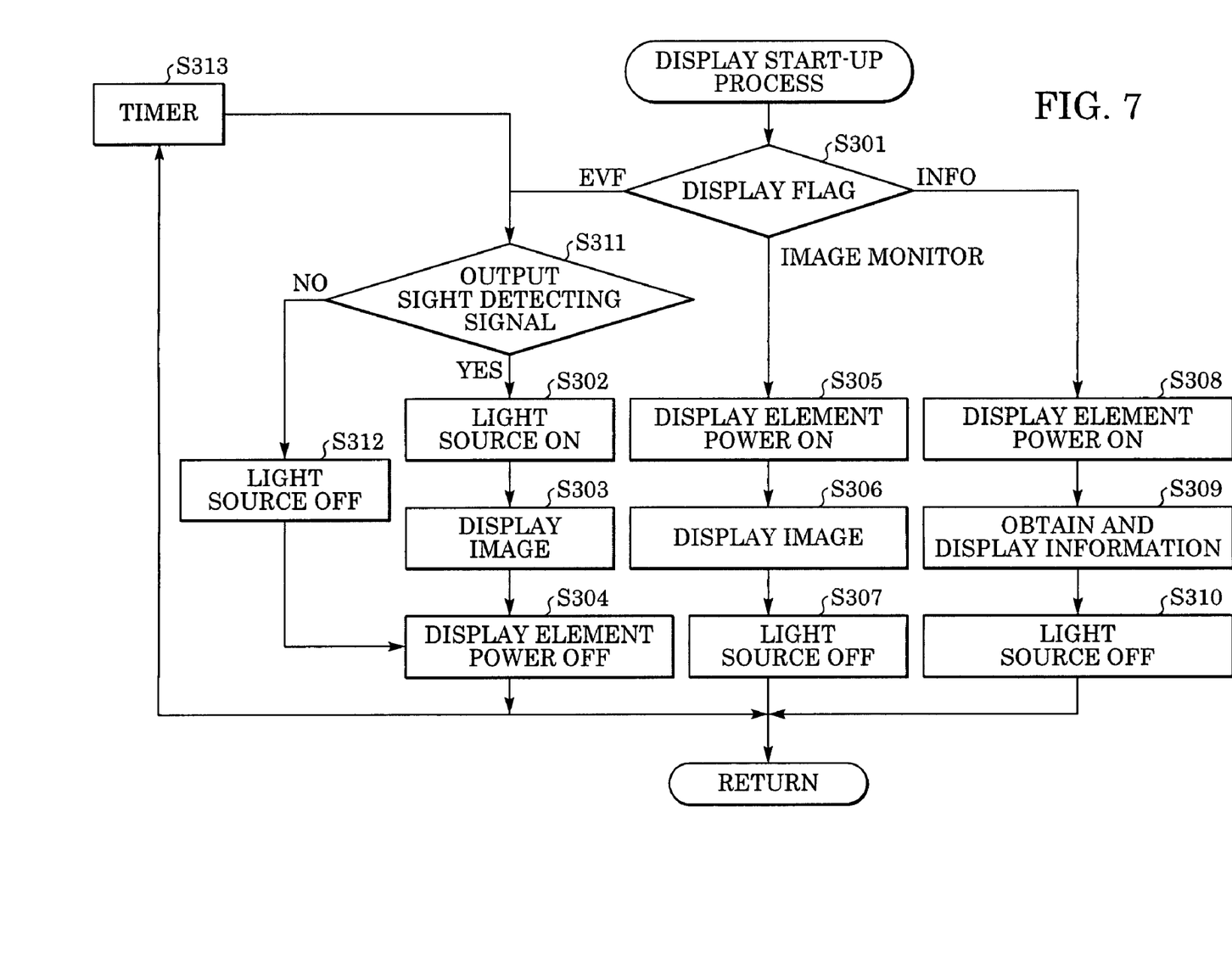
FIG. 7 is flow chart illustrating the image display switching process of Step S106 according to a second embodiment.

FIG. 7 is a flow chart illustrating a display switching process according to this embodiment, corresponding to Step 106 of the first embodiment. The processing program is stored in the memory 52 and is executed by a CPU included inside the system control circuit 50. The steps that are the same as the steps in the first embodiment are indicated by the same reference number and their descriptions are omitted.

The display switching process according to the second embodiment is the same as the display switching process according to the first embodiment except for the steps after Step S301, if the value of the display flag represents "EVF." If the display flag represents "EVF" in Step S301, the system control circuit 50 detects a signal output by a pointing system (not shown in the drawings) based on sight detection (Step S311). The system control circuit 50 only has to detect whether or not a signal is output. If a signal is output, the process proceeds to Steps S302, S303, and S304 to turn on the light source 301, turns on the image display of the electronic viewfinder 104, and turns off the image display unit 28 as required. Simultaneously, a timer is started (Step S313) and whether or not a sight detection signal is output is detected at predetermined time intervals (Step S311). These steps are repeated. Accordingly, the electricity consumption of the system can be reduced.

The process described above was based on the system of the electronic camera 100 according to the present invention. However, it is also possible to apply the above-described process in order to control a video system for recording moving images on a medium, such as a magnetic tape.

As described in the first and second embodiments, by controlling the oscillation of the light-scanning unit 303, which is produced based on MEMS technology, in response to the on and off state of the main power of the imaging apparatus including the electronic viewfinder 104, the start-up time of the electronic viewfinder 104 can be shortened.

As described in the second embodiment, by suitably controlling the on and off state of the light source 301 included in the electronic viewfinder 104 by using a pointing system based on sight detection, electricity consumption can be reduced and the operation time of the primary battery, such as an alkaline battery or a lithium battery, and the secondary battery, such as a NiCd battery, a NiMH battery, or a Li battery, can be extended.

Moreover, by starting up the image display in accordance with the value indicated by the display flag stored in the non-volatile memory, the electronic camera 100 can be restarted with the same settings as before the battery was replaced or before the mode dial 60 was set to POWER OFF, even if the battery of the electronic camera 100 is replaced or the mode dial 60 is switched from POWER OFF to shooting mode.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-028162 filed Feb. 4, 2004, which is hereby incorporated by reference herein.

What is claimed is:

1. An imaging apparatus comprising:
   an electronic viewfinder; and
   a controller,
   wherein the electronic viewfinder includes a light source and a scanning unit for scanning light emitted from the light source, and
   wherein the electronic viewfinder forms a two-dimensional image on a predetermined surface by synchronously modulating the light emitted from the light source with the operation of the scanning unit, and wherein the controller independently controls the timing of turning on and off the light source and turning on and off the scanning unit;

wherein the controller controls the light source and the scanning unit in response to the on and off state of the power of the imaging apparatus wherein, in response to the imaging apparatus being turned on, the scanning unit is turned on and the light source is turned on after oscillation control of the scanning unit is stabilized.

2. An imaging apparatus according to claim 1, wherein the light source is turned on and off in response to the on and off state of an image displayed on the electronic viewfinder.

3. An imaging apparatus according to claim 2, wherein an image displayed on the electronic viewfinder is turned on and off in accordance with an operation carried out on the imaging apparatus by a user.

4. An imaging apparatus according to claim 2, wherein an image displayed on the electronic viewfinder is turned on and off in accordance with results of a detection process for detecting the presence of a viewer looking into the electronic viewfinder, wherein the detection process is performed by a detecting unit.

5. A method for controlling an imaging apparatus comprising an electronic viewfinder including a light source and a scanning unit for scanning light emitted from the light source, the method comprising:

turning a light source of the electronic viewfinder on and off; and turning a scanning unit of the electronic viewfinder on and off;

wherein the light source and the scanning unit are turned on and off in response to the on and off state of the power of the imaging apparatus wherein, in response to the imaging apparatus being turned on, the scanning unit is turned on and the light source is turned on after oscillation control of the scanning unit is stabilized.

6. A memory storing computer-executable process steps and readable by a central processing unit for controlling an imaging apparatus comprising an electronic viewfinder including a light source and a scanning unit for scanning light emitted from the light source, the steps comprising:

turning a light source of the electronic viewfinder on and off; and turning a scanning unit of the electronic viewfinder on and off;

wherein the light source and the scanning unit are turned on and off in response to the on and off state of the power of the imaging apparatus wherein, in response to the imaging apparatus being turned on, the scanning unit is turned on and the light source is turned on after oscillation control of the scanning unit is stabilized.

* * * * *